United States Patent [19]

Sawatani

[11] Patent Number: 4,496,863
[45] Date of Patent: Jan. 29, 1985

[54] SALIENT-POLE ROTOR OF A ROTARY ELECTRIC MACHINE

[75] Inventor: Kenji Sawatani, Kobe, Japan

[73] Assignee: Mitsubishi Denki Kabushiki Kaisha, Tokyo, Japan

[21] Appl. No.: 486,235

[22] Filed: Apr. 18, 1983

[30] Foreign Application Priority Data

| Apr. 22, 1982 | [JP] | Japan | 57-60009[U] |
|---|---|---|---|
| Apr. 22, 1982 | [JP] | Japan | 57-60010[U] |
| Apr. 22, 1982 | [JP] | Japan | 57-60011[U] |
| Apr. 22, 1982 | [JP] | Japan | 57-60012[U] |
| Apr. 22, 1982 | [JP] | Japan | 57-60013[U] |
| Apr. 22, 1982 | [JP] | Japan | 57-60014[U] |
| Apr. 22, 1982 | [JP] | Japan | 57-60015[U] |
| Apr. 22, 1982 | [JP] | Japan | 57-60016[U] |
| Apr. 22, 1982 | [JP] | Japan | 57-60017[U] |
| Apr. 22, 1982 | [JP] | Japan | 57-60019[U] |
| Apr. 22, 1982 | [JP] | Japan | 57-60022[U] |

[51] Int. Cl.³ .............................................. H02K 9/16
[52] U.S. Cl. ...................................... 310/61; 310/59; 310/269
[58] Field of Search ................... 310/59, 60 R, 60 A, 310/157, 258, 259, 269, 52, 61, 62, 63, 58, 65

[56] References Cited

U.S. PATENT DOCUMENTS

| 2,043,120 | 6/1936 | Punga et al. | 310/61 |
| 2,974,239 | 3/1961 | Havelka | 310/61 |
| 3,242,360 | 3/1966 | Carle | 310/59 |
| 3,261,994 | 7/1966 | Franz | 310/61 |
| 3,742,266 | 6/1973 | Heller et al. | 310/61 |

FOREIGN PATENT DOCUMENTS 315791 11/1919 Fed. Rep. of Germany ........ 310/61

Primary Examiner—J. D. Miller
Assistant Examiner—D. L. Rebsch
Attorney, Agent, or Firm—Leydig, Voit, Osann, Mayer and Holt, Ltd.

[57] ABSTRACT

Cooling medium flows from the rotor of a rotary electric machine from a rotor side towards an air gap side between the rotor and stator of the machine, wherein provision is made of guide vanes such that the cooling medium flows in a direction opposite to the direction in which the rotor rotates, reducing the angular momentum of the coolant to zero, to increase circulation efficiency.

8 Claims, 16 Drawing Figures

4,496,863

SALIENT-POLE ROTOR OF A ROTARY ELECTRIC MACHINE

BACKGROUND OF THE INVENTION

1. Field of the Invention

This invention relates to a rotor of a rotary electric machine which features reduced ventilation drive loss and increased efficiency.

2. Description of the Prior Art

A conventional salient-pole rotor of a synchronous motor has been constructed as shown in a vertical section view of FIG. 1 and a sectional plan view of FIG. 2. Namely, FIGS. 1 and 2 illustrate the rotor of a vertical shaft type machine with rotary shaft 1, rotor spider 2, rim 3 which is inserted and adhered to the rotor spider and which constitutes a yoke of the rotor, and a plurality of ventilation ducts 4 formed in a radial direction in the rim. Ventilation gaps are defined by a plurality of duct pieces 5 and gap rings 6. Bolts 7 fasten the rim 3 with nuts 8. A plurality of salient pole cores 10 consist of a laminate of thin steel plates, which are fastened by bolts, and which are adhered to the outer periphery of the rim 3; Salient pole 9 consists of the pole core 10 and the field coil 11, and fan 12 is mounted on the rim 3.

Stator frame 13 supports stator core 14 and has ventilation ducts 15 in the radial direction, stator coil 16, enclosure 17, rotor 18, which consists of the above-mentioned members 1 to 12, stator 19, which consists of the above-mentioned members 13 to 17, with air gap 20 defined between the rotor 18 and the stator 19.

In the above-mentioned conventional device, when the rotor 18 rotates, the cooling air introduced by the fan 12 cools the ends of field coils 11, and flows along the ends of the stator coil 16 as indicated by arrows, cooling the coils. Further, the cooling air introduced at the side of inner diameter of the rotor spider 2 flows through the ventilation ducts 4, and flows through the neighboring field coils 11 as indicated by arrows, cooling them. The cooling air flowing through the field coils 11 gushes through the air gap 20 being assisted by the fan action created by salient poles, and then flows through ventilation ducts 15 formed in the stator to cool the stator coil 16 and the stator core 14.

Here, mechanical loss of the rotor 18 can be divided into windage loss and bearing loss. The windage loss is further divided into ventilation drive loss that results from the ventilation, and friction loss that results from the friction with the surrounding air. With the above-mentioned conventional construction, however, the cooling air flowing through the poles 9 gushes into the air gap 20 maintaining nearly the same angular velocity as the rotor 18. Namely, the cooling air gushes into the air gap 20 having a large angular momentum. The angular velocity, however, becomes zero when the cooling air enters into ventilation ducts 15 of the stator 19 after passing through the air gap 20. Therefore, the large angular momentum of the cooling air turns directly into ventilation drive loss, and makes it difficult to obtain a high efficiency.

SUMMARY OF THE INVENTION

The invention was accomplished in order to remove the defects inherent in the conventional art, and has as its object to provide a rotor of a rotary electric machine in which guide covers are provided between head portions of poles so that the cooling medium gushes into the air gap through the poles in a direction opposite to the rotating direction of the rotor, thereby reducing ventilation drive loss of the cooling medium gushing into the air gap, and accordingly to sufficiently increase the efficiency of the machine.

BRIEF DESCRIPTION OF THE DRAWINGS

In the drawings, the same reference numerals represent the same or corresponding portions.

DESCRIPTION OF THE PREFERRED EMBODIMENTS

Figure 1:
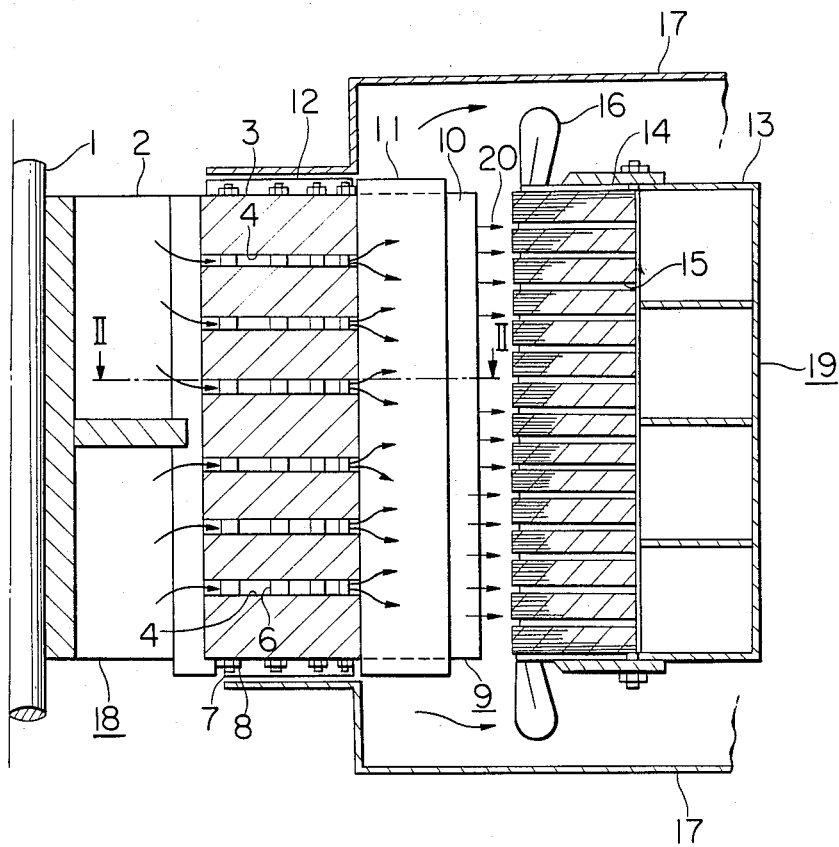
FIG. 1 is a partly cut-away front view of a conventional salient-pole rotor.
Figure 2:
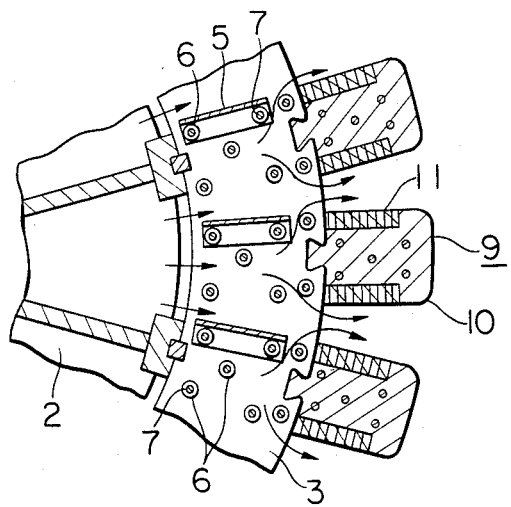
FIG. 2 is a partly cut-away front view along the line II—II of FIG. 1, which is diagramed on an enlarged scale.
Figure 3:
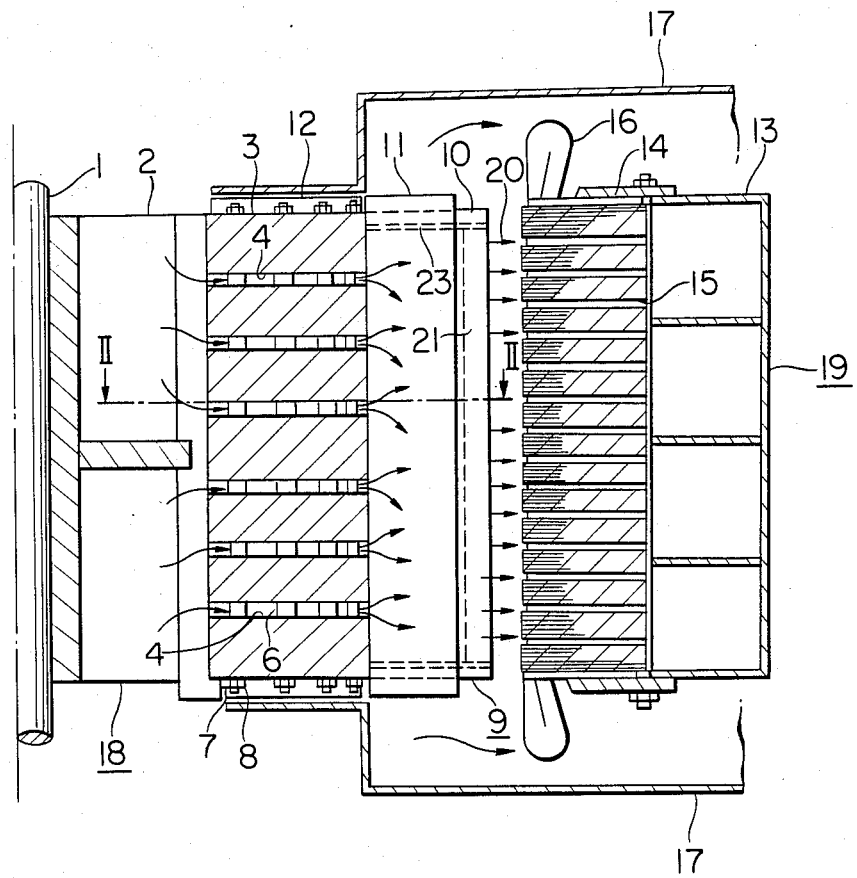
FIG. 3 is a partly cut-away front view showing a salient-pole rotor according to this invention.
Figure 4:
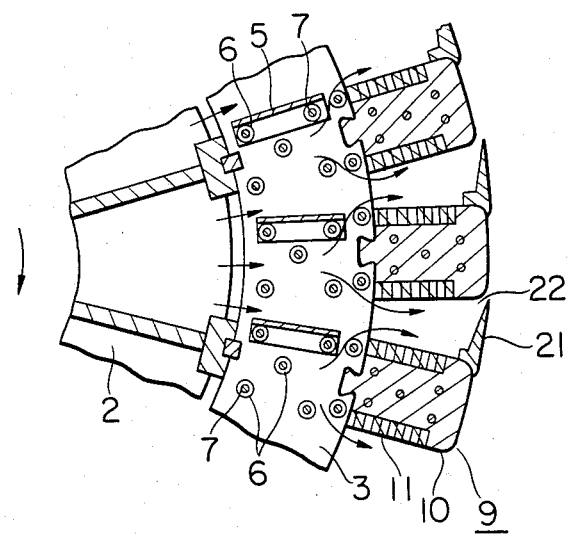
FIG. 4 is a partly cut-away front view along the line II—II of FIG. 1, which is diagramed on an enlarged scale.
Figure 5:
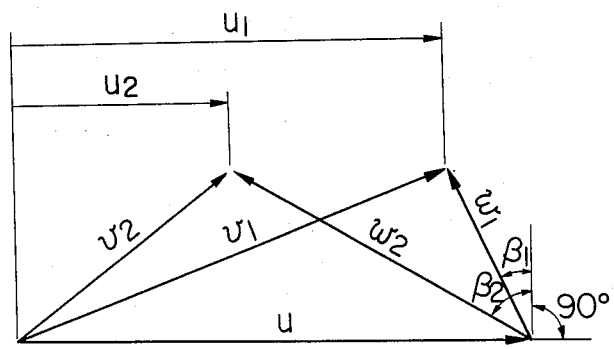
FIG. 5 is a vector diagram for illustrating the principle of this invention.

Construction of a salient-pole rotor of a rotary electric machine of this invention will be described below in conjunction with the drawings. FIGS. 3 to 6A illustrate an embodiment of this invention, in which reference numerals 1 to 20 denote the same members as those of the aforementioned conventional device. Guide cover 21 is fastened to the head portion of a magnetic pole 9 by a bolt (not shown) to form a gushing path 22 relative to the head portion of an adjacent magnetic pole 9. The guide cover 21 stretches over the whole length between neighboring adjacent poles, and constitutes an outer peripheral surface of the rotor 18 together with the outer peripheral surface of the pole core 10, such that the cooling air flowing through the poles 9 will gush from the gushing path 22 into the air gap 20 in a direction opposite to the rotating direction of the rotor 18. Sealing plates 23, provided among the poles 9, prevent the cooling air which flows from the ventilation ducts 4 in the rim 3 and into the poles 9 from escaping from the upper and lower sides of the poles 9.

The guide cover 21 which is subjected to highly intense magnetic field conditions sould be made of a nonmagnetic material which does not produce heat due to eddy currents. For this purpose, use should be made of stainless, aluminum, FRP (glass fiber-reinforced plastic material), a laminate of thermosetting resin plates, or the like.

When the thus constructed rotor 18 rotates, the cooling air entering the side of inner diameter of the rotor spider 2 flows through ventilation ducts 4, and flows through neighboring field coils 11 to cool them. Being assisted by the fan action of the salient poles, the cooling air flowing through the poles 9 gushes into the air gap 20 through the gushing paths 22 between the head portions of the pole cores 10 and the guide covers 21 in a direction opposite to the rotating direction of the rotor 18. The cooling air which has passed through the air gap 20 flows through ventilation ducts 15 in the stator 19 to cool the stator coil 16 and the stator core 14. The flow of the cooling air created by the fan 12 is the same as that of the aforementioned conventional device.

As mentioned above, the guide cover 21 causes cooling air to gush through a path defined between neighboring adjacent poles 9 into the air gap 20 in a direction opposite to the rotating direction of the rotor. Therefore, the angular velocity of the cooling air decreases, and the angular momentum is decreased. It is therefore possible to reduce the ventilation drive loss that results from the cooling air angular momentum that is subsequently lost in the air gap 20. This fact is explained below in conjunction with FIG. 5.

In the conventional device, the cooling air flowing through the poles 9 proceeds directly in the radial direction and gushes into the air gap 20. Therefore, angle $\beta_1$ defined by the speed $\omega_1$ of the cooling air gushing into the air gap 20 relative to the peripheral speed u of the poles 9, is close to 0° with respect to the radial direction, while peripheral speed component $u_1$ of the absolute speed $v_1$ is close to the peripheral speed u of the rotor 18. According to the embodiment of this invention, the gushing direction is tilted by $\beta_2$ in the direction opposite to the rotating direction by means of the guide cover 21; on the other hand, the speed $\omega_2$ relative to the peripheral speed u of the rotor 18 defines an angle $\beta_2$ with respect to the radial direction. Namely, peripheral speed component $u_2$ of the absolute speed $v_2$ can be decreased to be considerably smaller than the peripheral speed u of the rotor 18. For the same amount of ventilation, therefore, power for creating the ventilation varies in proportion to the peripheral speed component of absolute speed of the gushing, cooling air, and can hence be reduced to $u_2/u_1$.

That is, the angular velocity decreases and the angular momentum decreases with the decrease in the peripheral speed component of absolute speed of the cooling air which gushes into the air gap 20. It is therefore possible to greatly reduce the ventilation drive loss that results from the angular momentum and that is lost in the air gap 20.

Figure 6A:
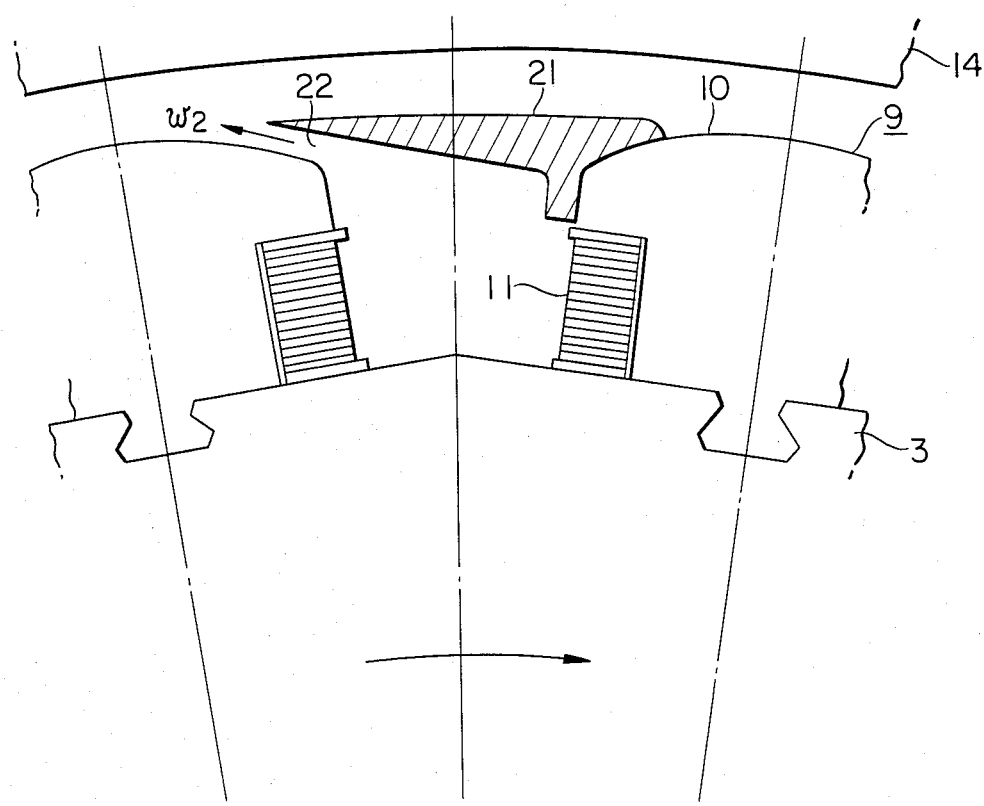
FIG. 6A is a partly cut-away front view which shows on an enlarged scale a portion in which a guide vane is mounted on one pole between the neighboring poles to form a gushing path.
Figure 6B:
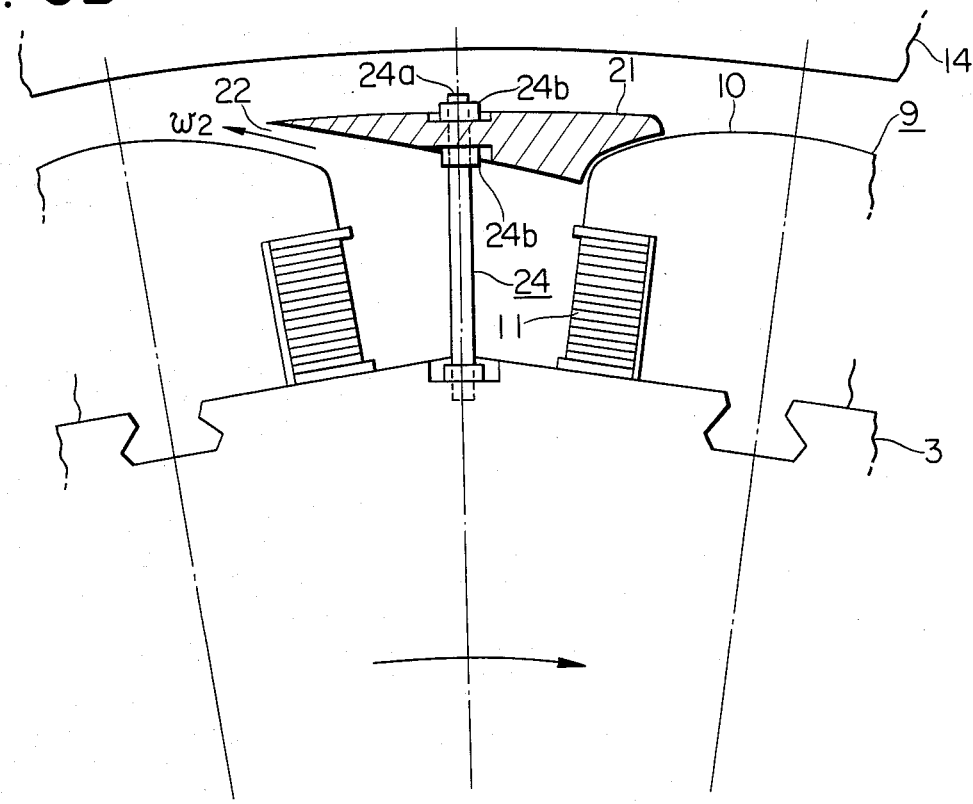
FIG. 6B is a partly cut-away front view which shows on an enlarged scale a portion in which the guide vane is supported by a support member to form a gushing path.
Figure 6C:
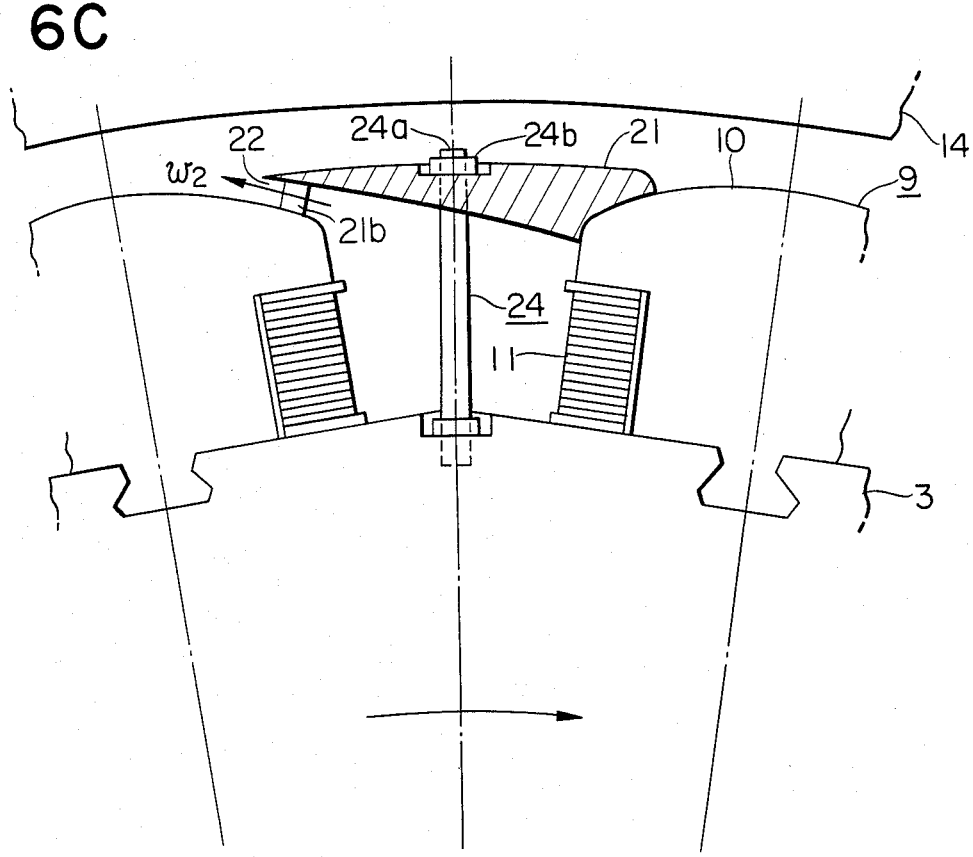
FIG. 6C is a partly cut-away front view which shows on an enlarged scale a portion in which the guide vane is secured by a securing member being stretched toward the rim side to form a gushing path.

The above-mentioned embodiment has dealt with the case in which the guide cover 21 is secured to the head portion of a pole by, for example, a bolt. The aforementioned described effect of the invention, however, can also be obtained even when a support member 24 consisting of a bolt 24a and a nut 24b is mounted on the rim 3, and the guide cover 21 is supported by the support member 24, wherein the guide cover 21 does not contact the head portion of an adjacent pole, as shown in FIG. 6B. As shown in FIG. 6C, furthermore, the support member 24 consisting of a bolt 24a and a nut 24b mounted on the rim 3, wherein the guide cover 21 is secured so that it is pulled towards the rim 3 against a spacer 21A placed on an adjacent pole core 10.

Figure 7A:
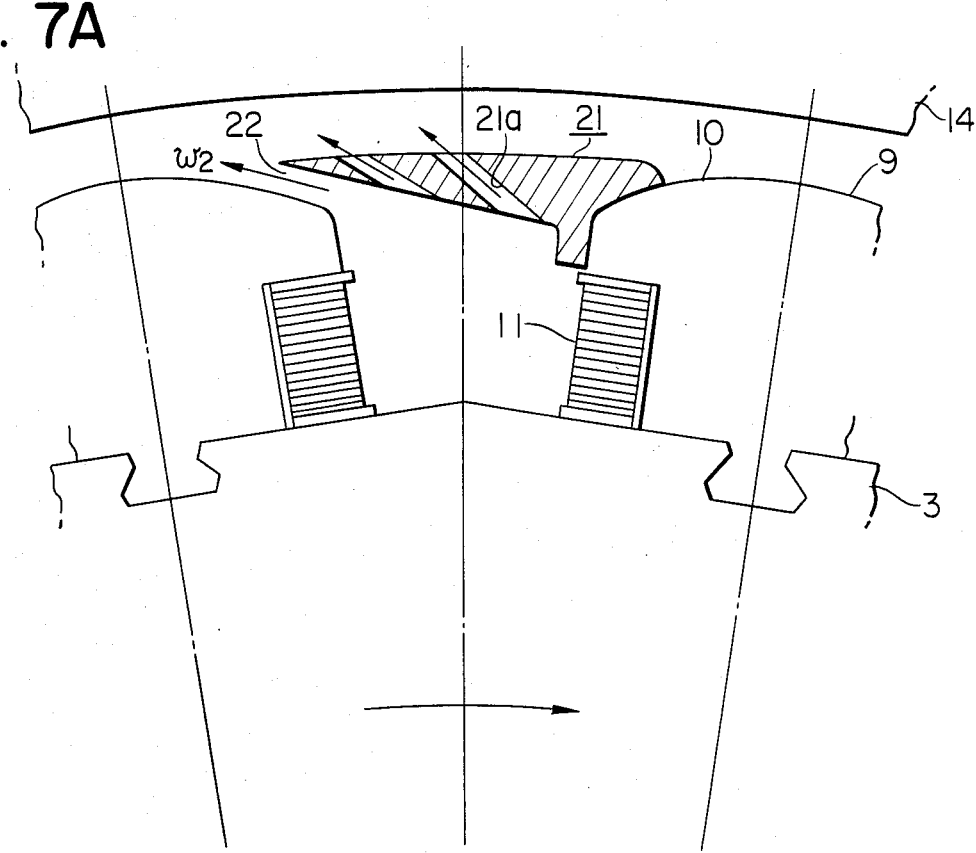
FIG. 7A is a partly cut-away front view which shows on an enlarged scale a portion in which a guide vane having one-way gushing ports formed in a slanting direction and which is mounted on one of the neighboring pole to form a gushing path.
Figure 7B:
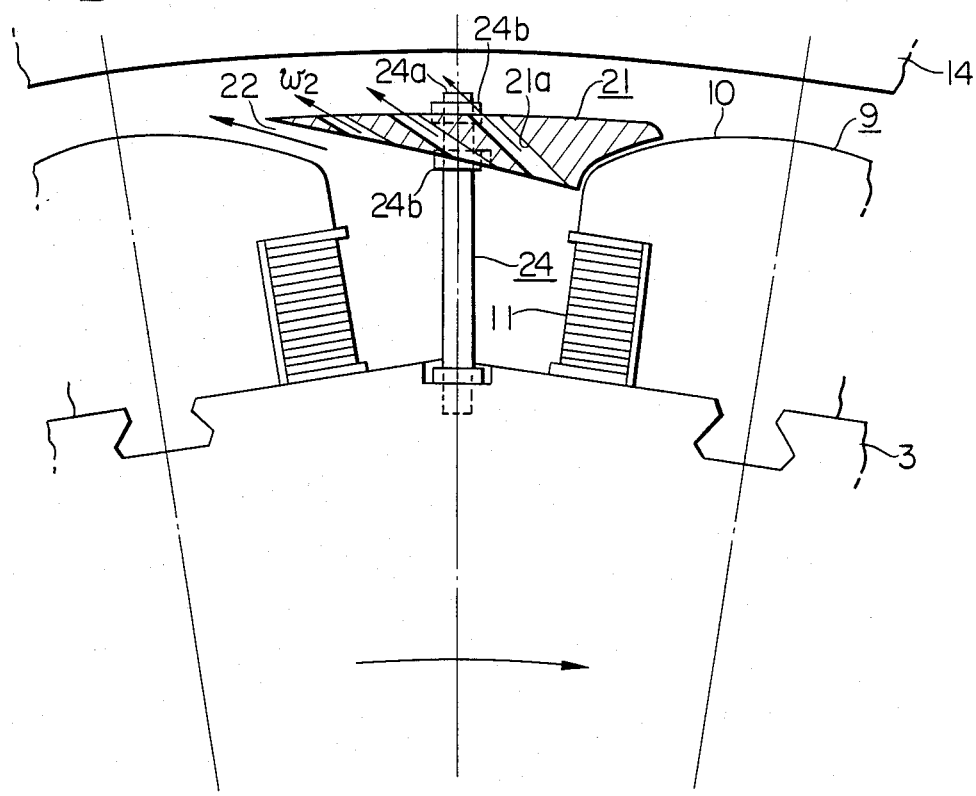
FIG. 7B is a partly cut-away front view which shows on an enlarged scale a portion in which the guide vane having one-way gushing ports formed in a slanting direction and which is supported by a support member to form a gushing path.
Figure 7C:
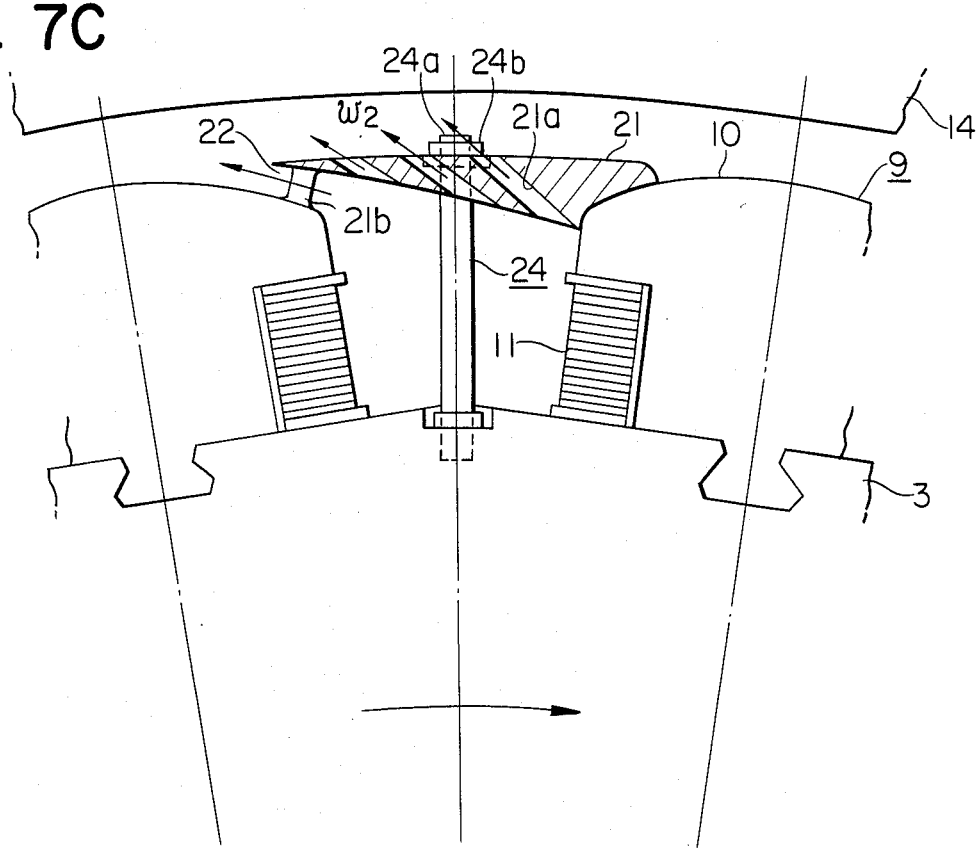
FIG. 7C is a partly cut-away front view which shows on an enlarged scale a portion in which the guide vane having one-way gushing ports formed in a slanting direction and which is secured by a securing member being stretched toward the rim side to form a guishing path.

FIG. 7A shows an embodiment in which gushing ports 21a are formed in the guide cover 21, so that the cooling air gushes into the air gap 20 through the gushing path 22 and through the gushing ports 21a. The gushing ports enable the cooling air to flow more effectively. FIGS. 7A, 7B and 7C illustrate embodiments which correspond to the embodiments of FIGS. 6A, 6B and 6C, respectively.

Figure 8A:
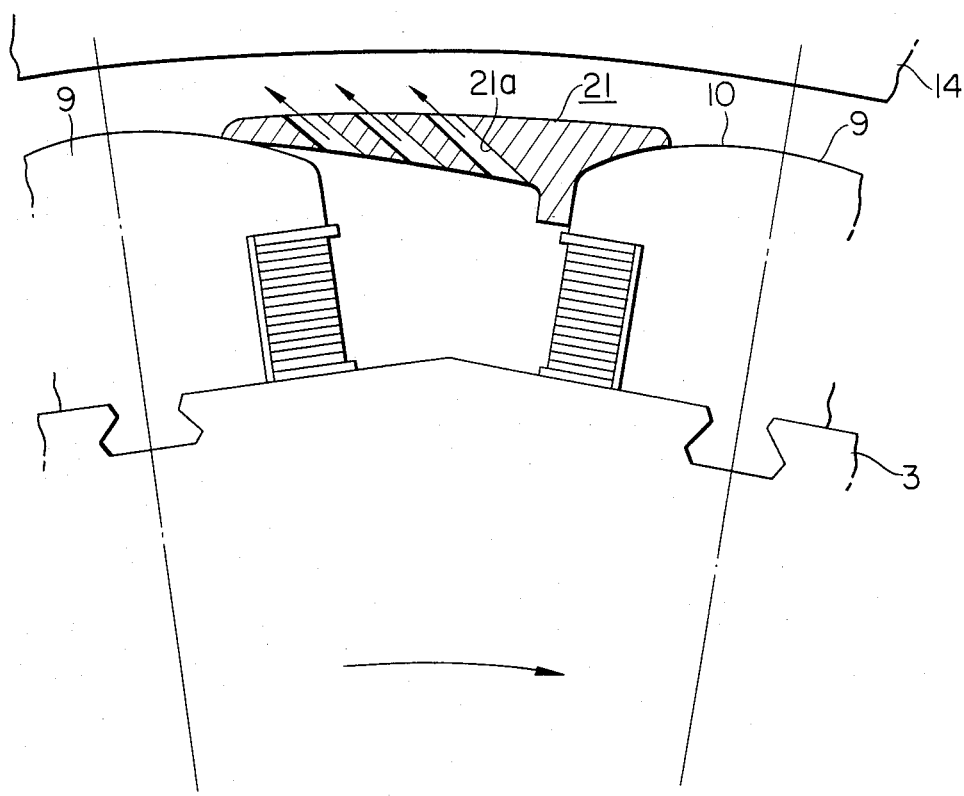
FIG. 8A is a partly cut-away front view showing on an enlarged scale a portion in which a guide vane having one-way stanting gushing ports formed therein and which is provided on one of the neighboring poles and spans to the adjacent neighboring pole.
Figure 8B:
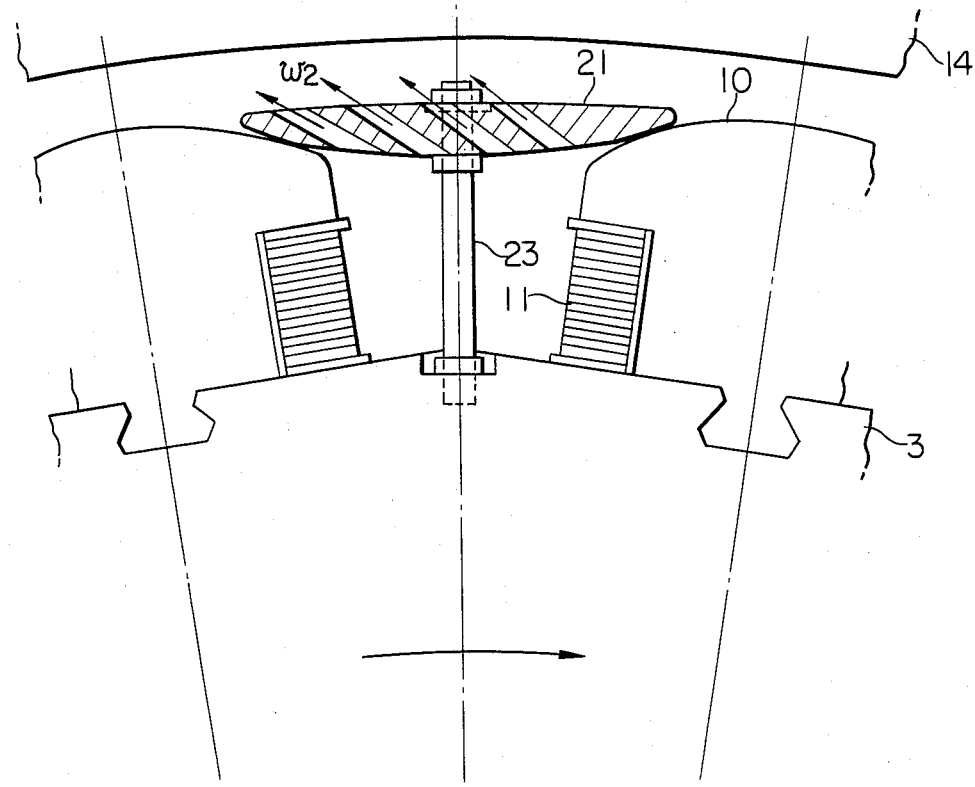
FIG. 8B is a partly cut-away front view which shows on an enlarged scale a portion in which a guide vane having one-way slanting gushing ports formed therein and which is supported by a support member and spans to the adjacent neighboring pole.
Figure 8C:
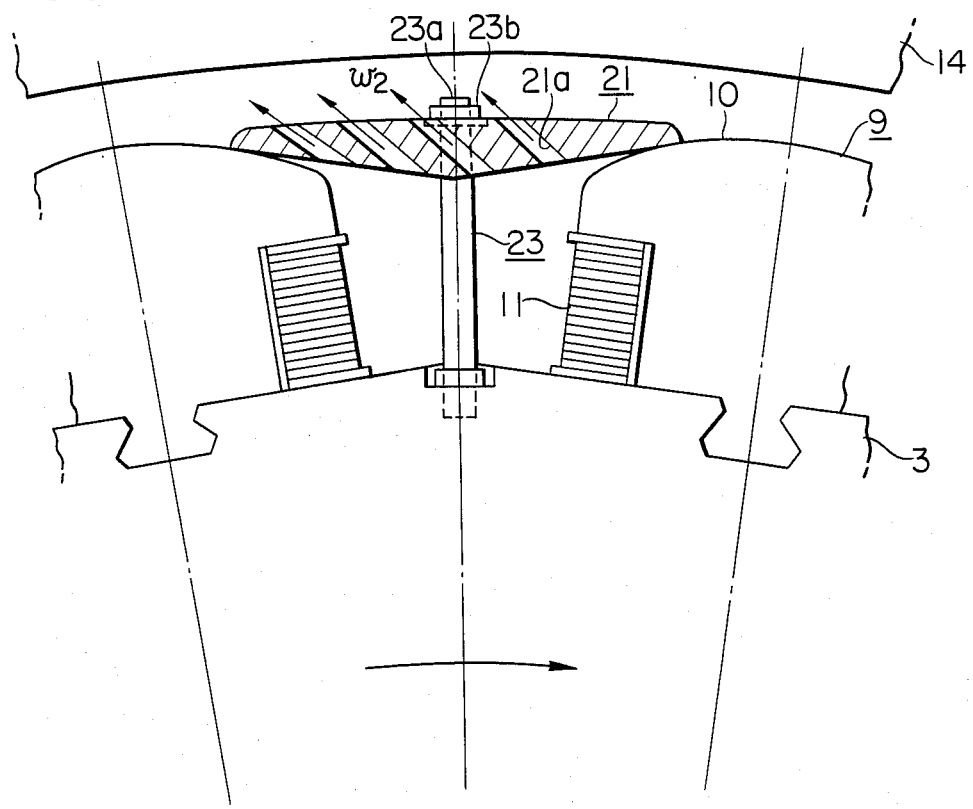
FIG. 8C is a partly cut-away front view which shows on an enlarged scale a portion in which the guide vane having one way slanting gushing ports formed therein and which is secured by a securing member being stretched toward the rim side, so as to span to the adjacent neighboring pole.

FIG. 8A hosws an embodiment in which a guide cover 21 having gushing ports 21a is provided spanning across neighboring poles 9 and 9. According to this embodiment in which the guide cover is mounted as mentioned above, the assembling operation can be simplified. FIGS. 8A, 8B and 8C show embodiments which correspond to the embodiments of FIGS. 6A, 6B and 6C, respectively.

Figure 9A:
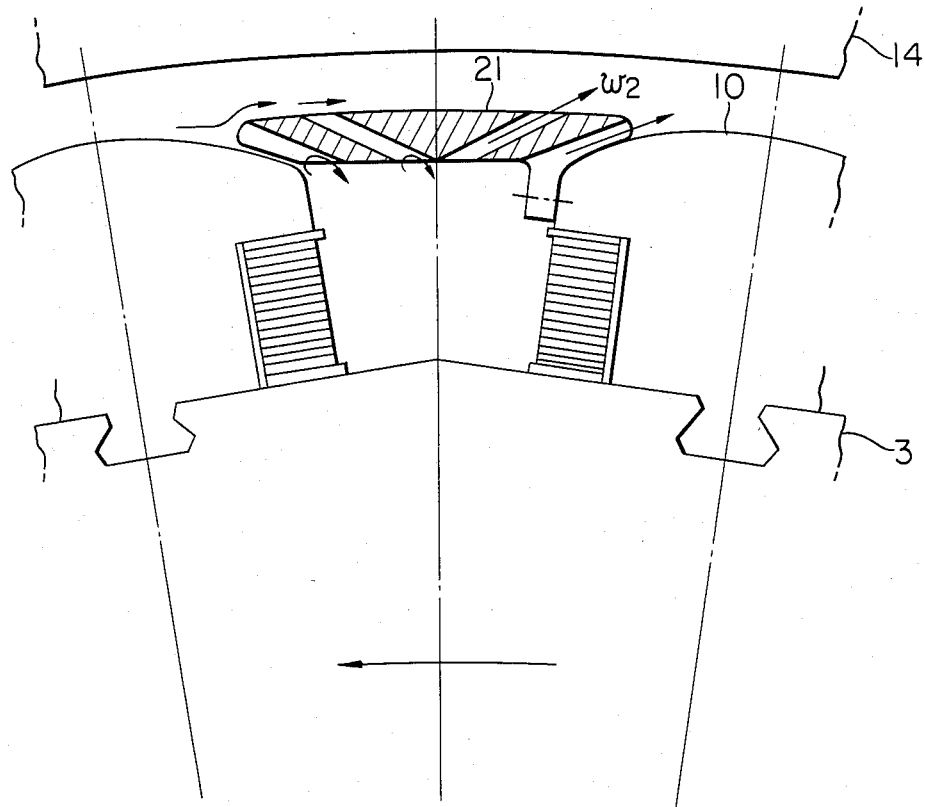
FIG. 9A is a partly cut-away front view which shows on an enlarged scale a portion in which a guide vane having two-way slanting gushing ports formed therein and which is mounted on a pole so as to span to the adjacent neighboring pole.
Figure 9B:
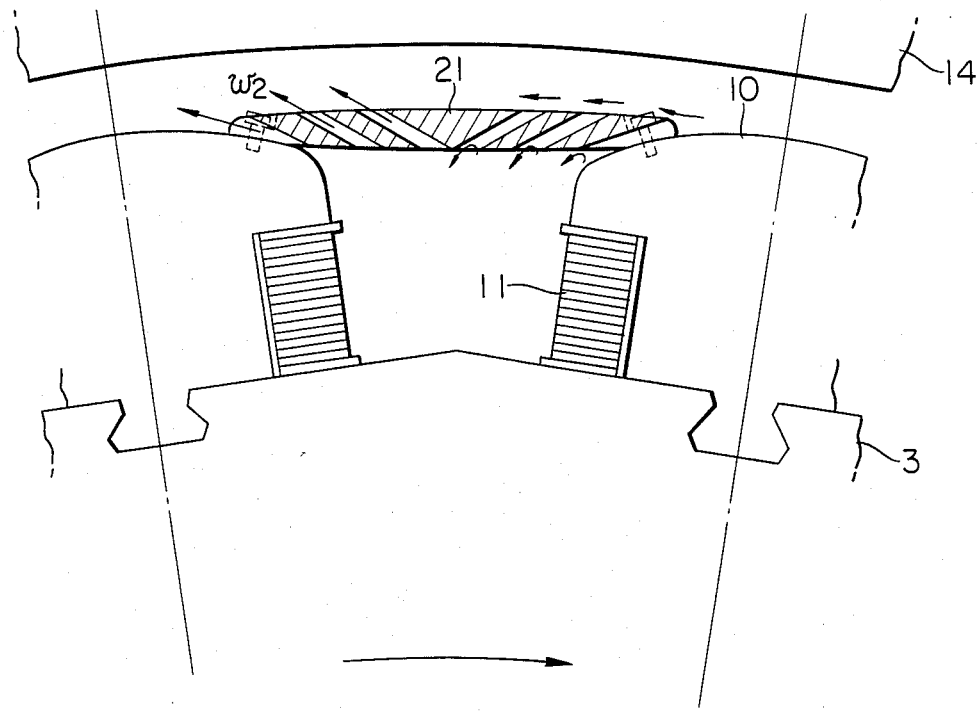
FIG. 9B is a partly cut-away front view showing on an enlarged scale a portion in which a guide vane having two-way slanting gushing ports formed therein and which is secured to the poles so as to span across neighboring adjacent poles.

In the above-mentioned embodiments, the rotary electric machine in which the rotor rotates in one direction is equipped with guide covers. The present invention, however, can also be adapted to rotary electric machines in which the rotor rotates in a forward direction and in a reverse direction. FIGS. 9A and 9B show embodiments for the above-mentioned case. This construction can be adapted to the aforementioned embodiments to obtain the effects as contemplated by the present invention, as a matter of course. The gushing ports formed in the guide vanes are suitably shaped so that the cooling air will flow smoothly.

What is claimed is:

1. In a salient-pole rotor of a rotary electric machine, axial inner passages in the rotor for cooling medium, radial passages between poles for said cooling medium to flow radially towards an air gap between the rotor and a stator, radial ventilation ducts in the stator, and separate nonmagnetic guide vanes attached to and located only adjacent head portions of the poles on said rotor and extending substantially continuously over the whole axial length of the rotor between neighboring adjacent poles, said guide vanes providing guide paths extending substantially the whole axial length of the rotor slanting in the direction opposite to the direction of rotation of said rotor to change the flow direction of said cooling medium from radial flow to peripheral flow from the radial passages between said poles into said air gap in a direction opposite to the direction in which the rotor rotates, to reduce the angular momentum of said cooling medium before entry under radial momentum into said radial ventilation ducts in the stator, and members fastened to the rotor and located between poles for securing said separate nonmagnetic guide vanes to the rotor, said members leaving the radial passages substantially unobstructed for radial flow of cooling medium from radial ventilation ducts and said axial inner passages in the rotor and through said guide paths into said air gap.

2. A salient-pole rotor of a rotary electric machine according to claim 1, wherein each guide vane is supported by a support member which is provided on a rim of said rotor and which protrudes between neighboring adjacent poles and by a spacer engaging one of the neighboring poles, and provides a guide port for gushing the cooling medium between said guide vane and either one of said adjacent poles, and said cooling medium gushes in a direction opposite to the direction in which the rotor rotates.

3. A salient-pole rotor of a rotary electric machine according to claim 1, wherein each guide vane has passages providing guide ports slanting therethrough in a direction opposite to the rotating direction of the rotor, and is secured by one of said members to a given pole to provide a guide path adjacent the head portion of an adjacent pole, and said cooling medium gushes through said guide ports and said guide path in a direction opposite to the direction in which said rotor rotates.

4. A salient-pole rotor of a rotary electric machine according to claim 1, wherein each guide vane has passages providing guide ports slanting therethrough in a direction opposite to the rotating direction of the rotor, and is supported by one of said support members so as to span across neighboring adjacent poles, said support members being provided on a rim of the rotor and protruding between said neighboring adjacent poles, and the cooling medium gushes through said guide ports in a direction opposite to the direction in which the rotor rotates.

5. A salient-pole rotor of a rotary electric machine according to claim 1, wherein each guide vane has passages providing guide ports slanting therethrough in a direction opposite to the rotating direction of the rotor, and is secured by a securing member so as to span across neighboring adjacent poles so as to be pulled towards a rim of said rotor, said securing member being provided on the rim of the rotor and protruding between neighboring poles, and the cooling medium gushes through said guide ports in a direction opposite to the direction in which the rotor rotates.

6. A salient-pole rotor of a rotary electric machine according to claim 1, wherein each guide vane has passages providing first and second guide ports slanting therethrough in opposite directions relative to each other, and is secured spanning across neighboring adjacent poles, and the cooling medium gushes through either the first or the second guide ports in a direction opposite to the direction in which the rotor rotates.

7. A salient-pole rotor of a rotary electric machine according to claim 1, wherein each guide vane has passages providing first and second guide ports slanting therethrough in opposite directions relative to each other, and is secured to either one of the poles of adjacent poles, and said cooling medium gushes through either the first or the second guide ports in a direction opposite to the direction in which the rotor rotates.

8. A salient-pole rotor of a rotary electric machine according to claim 1, wherein each guide vane has passages providing first and second guide ports slanting in opposite directions relative to each other, and is secured to both neighboring adjacent poles so as to span thereacross, and the cooling medium gushes through either the first or the second guide ports in a direction opposite to the direction in which the rotor rotates.

* * * * *